United States Patent [19]

Kishi et al.

[11] Patent Number: 4,571,670
[45] Date of Patent: Feb. 18, 1986

[54] NC PROGRAMMING APPARATUS

[75] Inventors: Hajimu Kishi, Hino; Kunio Tanaka, Akishima, both of Japan

[73] Assignee: Fanuc Ltd, Minamitsuru, Japan

[21] Appl. No.: 525,669

[22] Filed: Aug. 23, 1983

[30] Foreign Application Priority Data

Aug. 23, 1982 [JP] Japan ................................ 57-145836

[51] Int. Cl.$^4$ ........................ G06F 15/46; G05B 19/18
[52] U.S. Cl. ....................................... 364/171; 82/2 B; 318/568; 364/191; 364/474
[58] Field of Search ................................ 364/191–193, 364/167–171, 474, 475, 521; 318/568; 82/2 R, 2 B, 3, 25, 14 R, 36 A

[56] References Cited

U.S. PATENT DOCUMENTS

| | | | |
|---|---|---|---|
| 3,757,095 | 9/1973 | Kiwiet | 364/171 X |
| 3,783,253 | 1/1974 | Anderson et al. | 364/171 X |
| 4,033,206 | 7/1977 | Morita et al. | 364/474 X |
| 4,152,765 | 5/1979 | Weber | 364/191 X |
| 4,393,449 | 7/1983 | Takeda et al. | 364/191 X |
| 4,490,781 | 12/1984 | Kishi et al. | 364/191 |

OTHER PUBLICATIONS

"Fanuc System P-Model G FAPT Teacher" Manual, 1982.

Primary Examiner—Joseph Ruggiero
Attorney, Agent, or Firm—Staas & Halsey

[57] ABSTRACT

In creating an NC program for machining a workpiece using a plurality of tools in different quadrants, the paths traversed by each of the tools are displayed in a single quadrant on the basis of NC data in the process of being created, or on the basis of previously created NC data.

7 Claims, 6 Drawing Figures

NC PROGRAMMING APPARATUS

BACKGROUND OF THE INVENTION

This invention relates to a numerical control (NC) programming apparatus. More particularly, the invention relates to an NC programming apparatus used in creating an NC program for machining a workpiece in separate quadrants by each of a plurality of tools, or in verifying an already created NC tape in which the NC program has been punched.

A lathe having four simultaneously controllable axes, referred to hereinafter simply as a "four-axis lathe", is equipped with two tool rests each of which is independently controlled during the machining of a workpiece. Such a lathe may come equipped with one or two spindles. FIG. 1 is an explanatory view of a four-axis lathe having one spindle. The reference symbol SP represents the spindle, WK a workpiece held and rotated by a chuck CHK, and TL1, TL2 first and second tool rests, respectively. With a four-axis lathe of this kind, the two tool rests TL1, TL2 respectively machine the single workpiece WK in the first and fourth quandrants of the XZ plane, where the x axis is the axis by the spindle, enabling machining efficiency to be greatly improved.

Since the tool rests TL1, TL2 are transported in the first and fourth quadrants, respectively, an NC program is created for moving the tool rest TL1 in the first quadrant, and another NC program is created for moving the tool rest TL2 in the fourth quadrant. It has been attempted to display or plot the path of each tool on a CRT or plotter as the NC programs are being created, or in accordance with an already created NC tape in which the NC program have been punched. Since the machining is carried out in separate quadrants, one tool path is displayed or plotted in the first quadrant and the other in the fourth quadrant, as illustrated in FIG. 2. (It should be noted that the dashed line in FIG. 2 is not displayed or plotted.) This makes it difficult to grasp the overall contour machined by the tools of the tool rests TL1, TL2, and it cannot be readily ascertained whether the NC programming is correct. In other words, with an automatic programming apparatus in which a workpiece is machined in separate quadrants by each of a plurality of tools, a problem confronted in the prior art is that the paths traversed by the tools cannot be displayed together in one and the same quadrant, making it difficult to correctly apprehend or perceive the final, overall shape and, hence, to check the programs.

SUMMARY OF THE INVENTION

An object of the present invention is to provide an NC programming apparatus wherein NC programming can be checked for correctness with ease by simplifying observation of a machined shape in its entirety.

According to the present invention, the foregoing object is attained by providing an NC programming apparatus for creating an NC program in accordance with which a workpiece is subjected to machining by a plurality of tools in separate quadrants. The paths traversed by the tools are displayed in one and the same quadrant to enable the overall final shape of the workpiece to be apprehended correctly as perceived.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
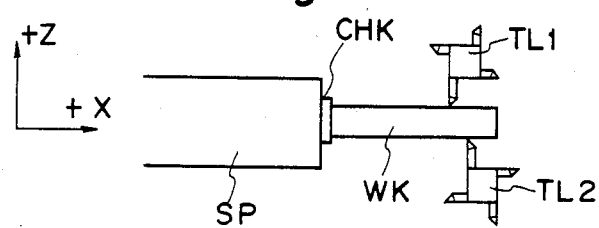
FIG. 1 is an explanatory view of a four-axis lathe having two tool rests each of which is controlled along two axes simultaneously.
Figure 2:
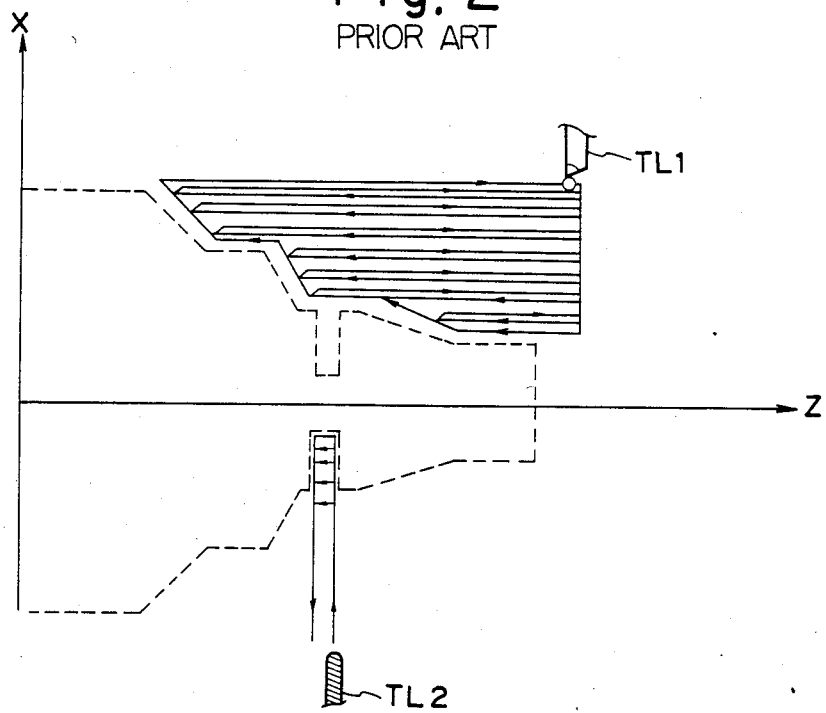
FIG. 2 is an example of a display of tool paths according to the prior art.
Figure 3:
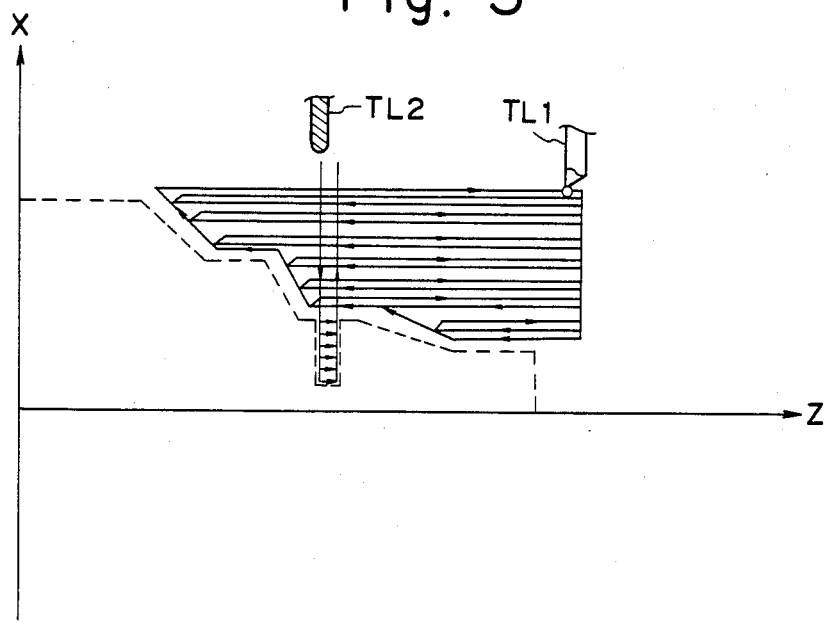
FIGS. 3 and 4 are examples of displays of tool paths according to the present invention.
Figure 4:
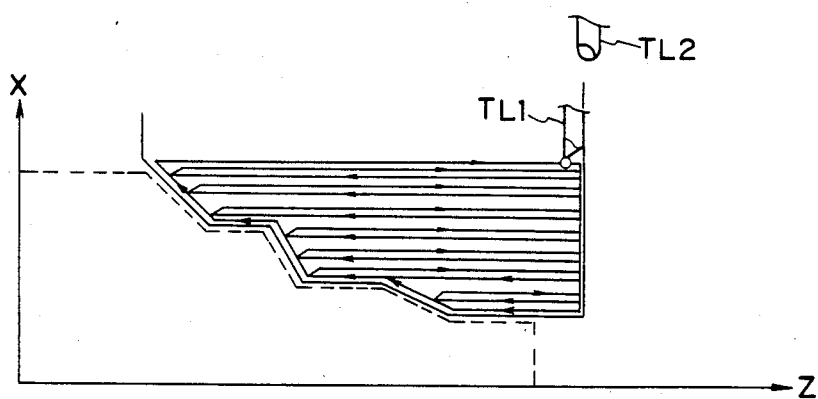

Reference will now be made to FIGS. 3 and 4 which are examples of displays of tool paths according to the present invention. Both figures relate to the four-axis lathe described above, the lathe having two tool rests TL1, TL2. The display in FIG. 3 is an example in which the paths traversed by the tools of the tool rests TL1, TL2 are displayed in the first quadrant for a case where a turning operation is performed in the first quadrant by the tool rest TL1 and a grooving operation is performed in the fourth quadrant by the tool rest TL2. The display in FIG. 4 is an example which the paths traversed by the tools of the tool rests TL1, TL2 are displayed in the first quadrant for a case where coarse cutting is performed in the first quadrant by the tool rest TL1 and fine or finishing cutting is performed in the fourth quadrant by the tool rest TL2. It should be noted that the dashed line in FIGS. 3 and 4 is not displayed.

Figure 5:
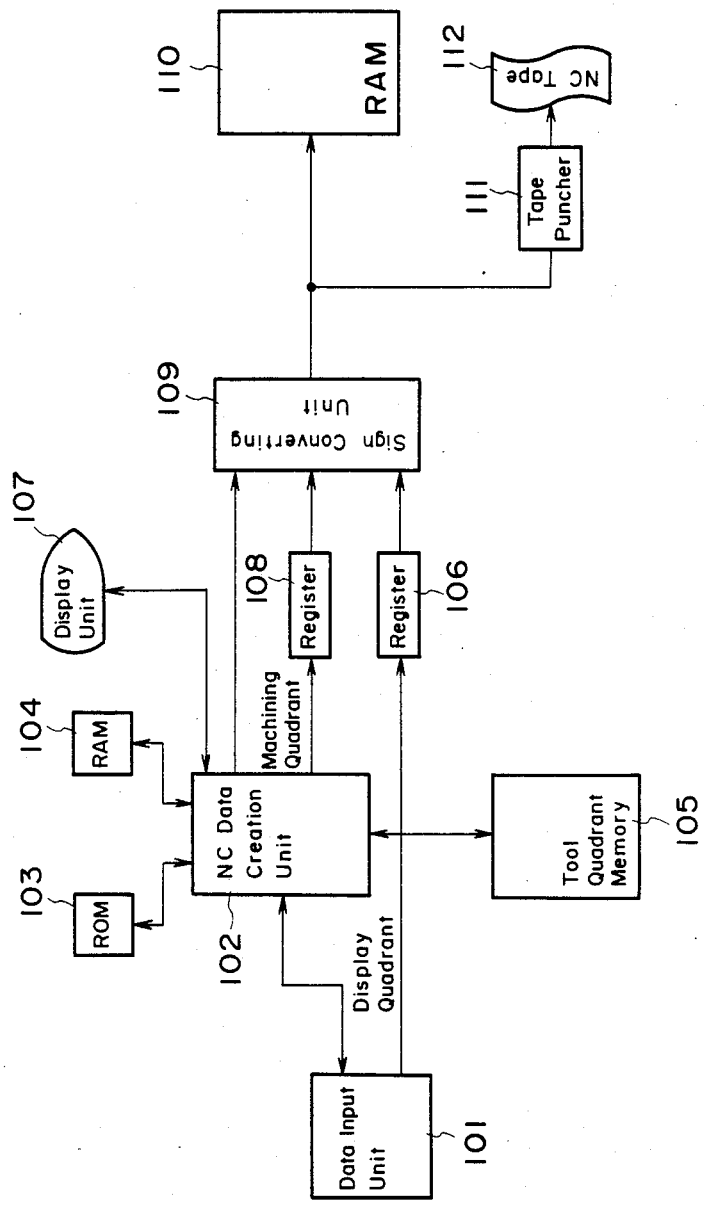
FIGS. 5 and 6 are block diagrams illustrating first and second embodiments, respectively, of an automatic programming apparatus according to the present invention.

FIG. 5 is a block diagram illustrating an embodiment of an automatic programming apparatus according to the present invention. A data input unit 101 such as a keyboard is provided for the entry of various data such as program data expressed by an automatic programming language. For further details, see the instruction manual "FANUC SYSTEM P-MODEL P FAPT TEACHER", June, 1980, published by Fujitsu Fanuc K.K. When the program data is entered, an NC data creation unit 102 creates NC data, which is then stored in a RAM 104, under the control of a control program for NC part program creating stored in a ROM 103. We will assume that the program data entered via the data input unit 101 are first and second program data (programs) for controlling first and second tool rests TL1, TL2 of a four-axis lathe, and that tool selection instructions have been inserted in each program at appropriate locations. Further, although the tools of the first and second tool rests actually machine a workpiece in the first and fourth quadrants, respectively, the first and second programs are created as programs for machining the workpiece in the first quadrant by the first and second tool rests. The reason for this will become apparent hereinbelow. A tool-quadrant memory 105 connected to the NC data creation unit 102 stores correspondence between tool codes and quadrants in which a workpiece is to be machined by the tools specified by the tool codes. The data input unit 101 is connected to a register 106 and is also used to enter data, which is stored in the register 106, indicating a quadrant (display quadrant) in which tool paths are to be displayed. In the illustrated embodiment, this quadrant is the first quadrant.

When the NC data creation unit 102 creates NC data and stores the data in the RAM 104, a display unit 107 displays the tool paths of the first and second tool rests, as depicted in FIG. 3 or 4, based on the NC data stored in the RAM. At the same time, the NC data creation unit 102 reads the first and second tool rest quadrant data from the tool-quadrant memory 105 and stores the data in a register 108. More specifically, the quadrant data read from the memory 105 and stored in the register 108 is quadrant data corresponding to a tool code inserted in the first program, and quadrant data corresponding to a tool code inserted in the second program. When this has been carried out, the NC data creation unit 102 accesses the RAM 104 and successively reads the NC data for the first tool rest and the NC data for the second tool rest from the RAM 104, and supplies the data to a sign converting unit 109. Since the working area of the first tool rest is the first quadrant, and since the display quadrant is also the first quadrant, the NC data for the first tool rest read from the RAM 104 is output by the sign converting unit 109 without being subjected to sign conversion by the converting unit 109. On the other hand, the working area of the second tool rest is the fourth quadrant while the display quadrant is the first quadrant. Therefore, the NC data for the second tool rest is output by the sign converting unit 109 after only the sign of the direction of movement along the X axis is changed. The coordinate system is as depicted in FIGS. 3 and 4. The NC data output by the sign converting unit 109 is stored in a RAM 110 and supplied to a tape puncher 111 where the data is punched into a paper tape 112 to created an NC tape.

Thus, programming using an automatic programming language such as APT or FAPT is carried out as if a workpiece will be machined by all of the tools in a display quadrant in which the tool paths are to be displayed. Then, based on the program data, NC data is created and the paths traversed by all tools are displayed in the display quadrant in accordance with the NC data. Meanwhile, the NC data is subjected to a sign conversion in accordance with the quadrants in which machining is actually to be performed, and the NC data is recorded using the NC data obtained by the sign conversion.

Instead of performing automatic programming for machining a workpiece in the quadrant in which the tool paths are to be displayed, as described above, it is possible to carry out programming using an automatic programming language in which the actual machining quadrants serve as a reference, and then change the sign of the NC data in accordance with the quadrant in which the tool paths are to be displayed. Such an embodiment will now be described with reference to FIG. 6.

Figure 6:
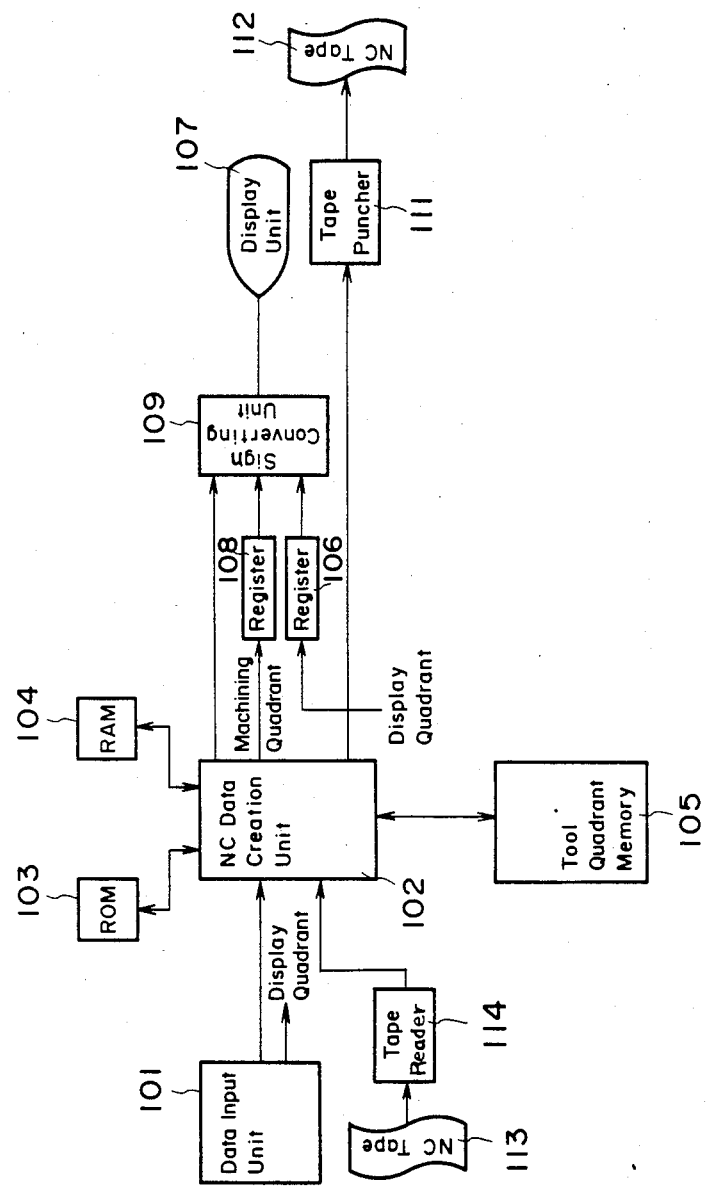

FIG. 6 is a block diagram illustrating a second embodiment of the present invention, in which portions similar to those of the first embodiment illustrated in FIG. 5 are designated by like reference characters. The second embodiment differs from the first in that (a) the register 108 for storing the machining quadrant for each tool, the register 106 for storing the display quadrant, and the sign converting unit 109, are provided between the NC data creation unit 102 and the display unit 107; (b) the memory 110 is deleted; and (c) a tape reader 114 is provided and connected to the NC data creation unit 102.

The sign converting unit 109 changes the sign of the X axis if the machining quadrant is the fourth quadrant when the display quadrant is the first quadrant. The resulting data is delivered to the display unit 107 so that all tool paths will be displayed in the first quadrant.

To verify the correctness of an NC tape 113 which has already been created, the NC data is read from the NC tape 113 by the tape reader 114 and stored in the RAM 104. Next, the quadrant (machining quadrant) corresponding to a tool code is read from the tool-quadrant memory 105 and stored in the register 108. Since the display quadrant is already stored in the register 106, the sign converting unit 109 changes the sign of the NC data from the RAM 104 based on the machining quadrant and the display quadrant. The resulting data is delivered to the display unit 107, which responds by displaying, in the display quadrant, the tool paths of the first and second tool rests read from the NC tape 113.

In accordance with the present invention as described and illustrated hereinabove, paths traversed by each of a plurality of tools are displayed in one and the same quadrant on the basis of NC data in the process of being created, or which has already been created. This makes it possible to observe the overall machining contour so that the correctness of NC programming can be easily ascertained. The invention also permits an already existing program to be checked very easily.

In effecting the display, different colors may be used to represent the different tool paths. This makes it easier to distinguish among the tool paths and, hence, facilitates the program checking operation. Although the machining quadrants are designated by the tool codes in the description given above, other arrangements are feasible. For example, the machining quadrants can be inserted in the program or entered from an external unit.

As many apparently widely different embodiments of the present invention can be made without departing from the spirit and scope thereof, it is to be understood that the invention is not limited to the specific embodiments thereof except as defined in the appended claims.

What we claim is:

1. A numerical control programming apparatus for creating a numerical control program in accordance with which a workpiece is subjected to machining by a plurality of tools in respective quadrants, said apparatus comprising:

creating means for creating numerical control data having a sign and specifying tool paths to be transversed by the tools in only one of the quadrants;

display means, operatively connected to said creating means, for displaying each of the tool paths in the one of the quadrants, in dependence upon the numerical control data;

quadrant designating means, operatively connected to said creating means, for designating the respective quadrants in which each of the tools perform machining; and converting means, operatively connected to said creating means and said quadrant designating means, for converting the numerical control data, specifying the tool paths, from the one of the quadrants in which the tool paths are displayed to the respective quadrants designated by said quadrant designating means, by changing the sign of the numerical control data.

2. A numerical control programming apparatus for creating and displaying in a display quadrant a numerical control program, including path data having a sign, in accordance with which a workpiece is subjected to machining by a plurality of tools in respective quadrants, said apparatus comprising:

quadrant designating means for designating a machining quadrant in which the tools machine the workpiece;

converting means, operatively connected to said quadrant designating means, for converting the sign of the path data included in the numerical control program, using the display quadrant in which the path data is displayed and the machining quadrant designated by said quadrant designating means;

creating means, operatively connected to said quadrant designating means and said converting means, for creating numerical control data, including data specifying tool paths to be traversed by each of the tools in only one of the quadrants, based upon the sign converted by said converting means; and display means, operatively connected to said converting means, for displaying each of the tool paths in the one of the quadrants in dependence upon the numerical control data created by said creating means.

3. A numerical control programming apparatus for creating a numerical control program which controls machining of a workpiece by tools in multiple quadrants, said apparatus comprising:

data creation means for specifying a machining quadrant and a tool path for each of the tools, and a single display quadrant for all of the tools; and converting means, operatively connected to said data creation means, for converting the tool path specified by said data creation means into at least one item of numerical control data for controlling the machining performed by the tools and into display data for displaying the tool path in the single display quadrant.

4. A numerical control programming apparatus as recited in claim 3, further comprising:

input means, operatively connected to said data creation means, for inputting numerical control data including the machining quadrant and the tool path for each of the tools;

quadrant designating means, operatively connected to said data creation means and said converting means, for storing the machining quadrant; and display means, operatively connected to said converting means, for displaying the display data.

5. A numerical control programming apparatus as recited in claim 3, further comprising:

quadrant designating means, operatively connected to said data creation means and said converting means, for designating the machining quadrant;

display means, operatively connected to said converting means, for displaying the tool paths in the single display quadrant; and recording means, operatively connected to said converting means, for recording the numerical control data.

6. A numerical control program creation method, comprising the steps of:

(a) indicating a display quadrant and a machining quadrant;

(b) creating first numerical control data for the display quadrant; and (c) converting the first numerical control data into second numerical control data for the machining quadrant.

7. A method for displaying numerical control data for numerical control in a machining quadrant, comprising the steps of:

(a) inputting the numerical control data;

(b) inputting a display quadrant;

(c) converting the numerical control data from the machining quadrant to display data in the display quadrant; and (d) displaying the display data.

* * * * *